Patented Nov. 18, 1952

2,618,646

UNITED STATES PATENT OFFICE 2,618,646

PRODUCTION OF ORGANOSILANES

David B. Hatcher and Raymond H. Bunnell, Toledo, Ohio, assignors to Libbey-Owens-Ford Glass Company, Toledo, Ohio, a corporation of Ohio No Drawing. Application February 23, 1949, Serial No. 77,997

18 Claims. (Cl. 260—448.2)

The invention relates to a method of producing organosilanes, including particularly aralkylsilanes, and to novel organosilanes that may be produced by such method.

The methods heretofore known for producing aralkylsilanes have been so expensive as to be of little commercial value.

The principal object of the invention is the economical and inexpensive production of aralkylsilanes. More specific objects and advantages are apparent from the description, which illustrates and discloses but is not intended to limit the scope of the invention.

Heretofore, a Friedel-Crafts catalyst (a halide of an amphoteric metal) has not been known to be useful in the reactions of organosilicon compounds. A Friedel-Crafts catalyst has been found to produce upon organosilicon compounds effects that are quite different from the effects of a Friedel-Crafts catalyst upon other organic compounds. Often the effects of a Friedel-Crafts catalyst on organosilicon compounds are undesirable and highly deleterious, so that such a catalyst ordinarily has not been used heretofore with organosilicon compounds. For example, one of the best known effects of a Friedel-Crafts catalyst on organosilicon compounds is to cause splitting of

bonds. Aluminum chloride is known to react with phenylsilanes to replace the phenyl groups by chloro groups, with the production of a tarry residue derived from the phenyl groups. Aluminum chloride is known also to react with beta-chloroethylsilanes to replace the beta-chloroethyl groups by chloro groups, with the formation of ethylene as a by-product. It is known that aluminum chloride undergoes a similar reaction with gamma-halopropylsilanes, with the formation of cyclopropane as a by-product.

The present invention is based upon the discovery that although a Friedel-Crafts catalyst is known to react with a large variety of organosilicon compounds to produce cleavage of

bonds, the presence of certain aromatic compounds in the reaction mixture with certain organosilicon compounds and certain Friedel-Crafts catalysts causes the reaction to take a course entirely different from the course that the reaction takes in the absence of the aromatic compounds. When the proper aromatic compound is present in a reaction mixture containing an organosilicon compound of the proper type and a certain specific Friedel-Crafts catalyst, the

bond is not cleaved as it ordinarily would be in the absence of the aromatic compound. On the contrary, the reaction takes a different course such that the

bond remains intact and a halo group in a haloalkyl radical attached to the silicon atom is replaced by an aromatic radical.

The procedure usually employed with Friedel-Crafts catalysts cannot ordinarily be used in the practice of the present invention because in the usual procedure washing with water or dilute acid is used to destroy complexes and to set free and separate the Friedel-Crafts catalyst. The organosilicon compounds used in the practice of the invention ordinarily have halo groups attached to silicon atoms, and this known procedure cannot be used because it would cause hydrolysis of such halo groups. In the method of the present invention, the Friedel-Crafts catalyst is removed at the end of the reaction by a different procedure hereinafter described.

Silanes whose molecule contains a phenyl radical connected by a methylene linkage to a silicon atom are known, but it has been possible to prepare such silanes heretofore only by an expensive Grignard reaction. Silanes whose molecule contains a phenyl radical connected by an ethylene linkage to a silicon atom have been obtainable only from styrene derivatives.

No silanes whose molecule contains an aromatic nucleus having a connection to a silicon atom through more than two aliphatic carbon atoms in series have been known. It is not possible to prepare such silanes from styrene derivatives, and no practical method has been known by which such silanes could be prepared. One aspect of the present invention is the discovery of a novel group of silanes, within the previously unknown class of silanes whose molecule contains an aromatic nucleus having a connection to a silicon atom through more than two aliphatic carbon atoms in series. The compounds obtained in the practice of the present invention, like phenyltrichlorosilane or ethyltrichlorosilane, may be used as intermediates in the production of silicone resins.

Although the present method is highly versatile in that it is capable of producing a wide variety of organosilanes, certain specific Friedel-Crafts catalysts and certain specific reactants must be used. The present method of producing organosilanes is carried out by contacting an aluminum halide in which each halogen atom has an atomic weight between 35 and 80 with a composition comprising a substance in which there is a halo-substituted aliphatic radical that is connected to silicon and contains at least one halogen atom having an atomic weight between 35 and 80, in which the carbon atoms connected to silicon are aliphatic, and in which any atom other than carbon, hydrogen, silicon and halogen consists of an oxygen atom connected to silicon, said composition containing a substance in which there is an aromatic radical having at least one nuclear hydrogen atom, in which any atom other than carbon, hydrogen, silicon and halogen consists of an oxygen atom connected to silicon, and in which any carbon atom connected to silicon is aliphatic. When the present method is carried out, a reaction takes place between two molecules, which may be identical or different molecules. In such reaction a halogen atom is split out of an aliphatic radical in one molecule and a hydrogen atom is split out of an aromatic nucleus in the other molecule so that the two reacting molecules are linked into a single molecule by a

bond.

The Friedel-Crafts catalyst employed in the practice of the invention consists of an aluminum halide in which each halogen atom has an atomic weight between 35 and 80 (i. e., aluminum chloride or aluminum bromide). The terms "aluminum chloride" or "aluminum bromide" are used herein to mean anhydrous aluminum chloride and anhydrous aluminum bromide. The preferred aluminum halide is aluminum chloride.

The composition with which the aluminum halide is contacted comprises a substance in which there is a halo-substituted aliphatic radical that is connected to silicon and contains at least one halogen atom having an atomic weight between 35 and 80, in which the carbon atoms connected to silicon are aliphatic, and in which any atom other than carbon, hydrogen, silicon and halogen consists of an oxygen atom connected to silicon. Such a substance may be either (a) a substance whose molecule consists of a silicon atom to which are attached four monovalent radicals at least one of which is a halo-substituted aliphatic or aralkyl radical containing at least one halogen atom having an atomic weight between 35 and 80 connected to an aliphatic carbon atom; from one to three of which may be halogens each having an atomic weight less than 80 (i. e., chloro, bromo or fluoro); and from one to three of which may be unsubstituted organic radicals or hydroxy radicals; or (b) a substance whose molecule consists of two silicon atoms connected by a divalent hydrocarbon or halo-substituted hydrocarbon radical, or consists of three silicon atoms connected by from two to three divalent hydrocarbon or halo-substituted hydrocarbon radicals, each remaining silicon valence being attached to a halogen having an atomic weight less than 80 or a monovalent organic radical or a hydroxy radical, said molecule containing from one to three halogens each of which has an atomic weight between 35 and 80 is present as a halo group in a mono- or di- or trivalent aliphatic radical, the divalent radicals and organic radicals being otherwise unsubstituted; or (c) a siloxane formed from one or more of the substances (a) and (b), e. g., by hydrolysis and condensation. A molecule of a substance (b) (hereinafter called an organic cross-linked silane) may be represented by the general formula

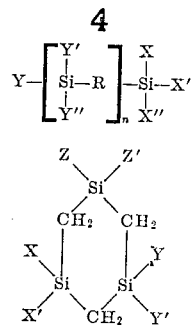

wherein $n$ is an integer from one to two; R is a divalent hydrocarbon or chloro- or bromo-substituted hydrocarbon radical; and each of the monovalent radicals X, X', X'', Y, Y', Y'', Z and Z' may be the same or different, and each is a halogen having an atomic weight less than 80, a chloro- or bromo-substituted alkyl or aralkyl radical, an unsubstituted organic radical or a hydroxy radical.

"Aliphatic radical" as used herein means a straight, branched, or closed chain aliphatic hydrocarbon radical having saturated

bonds. A straight or branched chain monovalent aliphatic radical attached to a silicon atom may be a primary or secondary alkyl radical having from one to twelve carbon atoms (i. e., methyl, ethyl, propyl, isopropyl, n-butyl, isobutyl, secondary butyl, or any primary or secondary alkyl radical having from 5 to 12 carbon atoms). A closed chain monovalent aliphatic radical attached to a silicon atom may be a cycloalkyl radical having 5 or 6 carbon atoms (i. e., cyclopentyl or cyclohexyl), or a mono-, di- or trialkyl-substituted cyclopentyl or cyclohexyl radical, each alkyl substituent being a primary, secondary or tertiary alkyl radical having from one to six carbon atoms, the total number of carbon atoms in the alkyl substituents being not more than six (i. e., the substituents being: one, two, or three methyls or ethyls; one ethyl and one methyl; two methyls and one ethyl; two ethyls and one methyl; either propyl radical, two propyl radicals; either propyl radical and one or two methyls; either propyl radical and ethyl; either propyl radical, one ethyl, and one methyl; any butyl radical; any butyl radical and methyl or ethyl; any butyl radical and two methyls; any pentyl radical; any pentyl radical and methyl; or any hexyl radical).

"Aralkyl radical" as used herein means a radical consisting of a monovalent aliphatic radical (as hereinbefore defined) in which one hydrogen atom has been replaced by an aromatic radical having from one to three benzene nuclei containing from 6 to 18 carbon atoms (e. g., radicals of the benzene, naphthalene, anthracene, phenanthrene, diphenyl or terphenyl series), having a total of not more than 20 nuclear and side chain carbon atoms, having not more than five side chains, and having no substituents or having from one to five nuclear substituents each of which is a halogen of atomic weight less than 80. Any side chain on the aromatic radical is a monovalent or divalent aliphatic radical containing not more than 6 carbon atoms, the side chains which are closed having from 2 to 6 carbon atoms connected either to one nuclear carbon atom (e. g., cyclohexylphenyl) or two different nuclear carbon atoms (e. g., acenaphthyl). An aralkyl radical attached to a silicon atom can be a benzyl radical or any monovalent aralkyl radical in one of the compounds prepared by the present method as hereinafter described.

A divalent hydrocarbon radical connecting two silicon atoms is (A) a divalent aliphatic radical which can be considered to be derived by the removal of two hydrogen atoms from the molecule of (1) a straight or branched chain, saturated aliphatic hydrocarbon having from one to 18 carbon atoms (i. e., the divalent hydrocarbon radical may be methylene, ethylene, trimethylene, propylene, any butylene, or any alkylene radical having from 5 to 18 carbon atoms, e. g., any polymethylene radical from pentamethylene to octadecamethylene); or (2) a cycloalkane (i. e., cyclopentane, cyclohexane, an alkylcyclopentane, an alkylcyclohexane of a substance in which two carbon atoms in the ring of cyclopentane or cyclohexane or an alkyl cyclopentane or cyclohexane are common to the ring of another such cycloalkane) in which the alkyl radicals, if any, attached to each ring, each have from one to six carbon atoms, have straight or branched chains, and are from one to two in number (i. e., each alkyl radical is methyl, ethyl, propyl, isopropyl, n-butyl, isobutyl, secondary butyl, tertiary butyl or a primary, secondary or tertiary alkyl radical having five or six carbon atoms); or (B) a divalent hydrocarbon radical that can be considered to be derived by the replacement of a hydrogen atom in such a divalent aliphatic radical by an aromatic radical, the aromatic radical being the same as in the aralkyl radical defined hereinbefore. A radical that is the aliphatic portion of a divalent hydrocarbon radical (B) is herein referred to as a "trivalent aliphatic radical."

A radical which is the aliphatic portion of an aralkyl radical or which is identical to the aliphatic portion of an aralkyl radical is included within the term "divalent aliphatic radical" as used herein.

"Halo-substituted aliphatic radical" or "halo-aliphatic radical," as used herein, means a radical consisting of any monovalent or divalent or trivalent aliphatic radical described herein in which from one to three of the hydrogen atoms have been replaced by halogen atoms having an atomic weight between 35 and 80. There should be no more than three such halogen atoms per molecule of the organosilane used in the present method (i. e., there may be three mono-substituted haloaliphatic radicals, or one-tri-substituted haloaliphatic radical, or two haloaliphatic radicals one of which is mono-substituted and one of which is di-substituted).

"Unsubstituted organic radical" as used herein includes not only aliphatic radicals and aralkyl radicals but also alkoxy radicals and aroxy radicals, the term "unsubstituted" indicating that these are hydrocarbon radicals except for the oxygen atom which connects them to the silicon atom. An alkoxy radical attached to a silicon atom can be any primary or secondary alkoxy radical having from one to four carbon atoms (i. e., methoxy, ethoxy, propoxy, isopropoxy, n-butoxy, isobutoxy, or secondary butoxy). An aroxy radical attached to a silicon atom can be any one in which the aryl group is phenyl, or a mono-, di- or tri-alkyl-substituted phenyl radical, each substituent being a primary, secondary or tertiary alkyl radical having from one to six carbon atoms, the total number of carbon atoms in the side chains being not more than six as hereinbefore described.

The substance hereinbefore referred to preferably is one whose molecule consists of a silicon atom to which are attached four radicals not more than two of which are unsubstituted monovalent aliphatic radicals as hereinbefore defined, from one to three of which are halogens having an atomic weight less than 80, and from one to two of which are monovalent haloaliphatic radicals as hereinbefore defined (e. g., mono-, di- or tri-chloro- or bromo-substituted methyl, ethyl, propyl, isopropyl, n-butyl, isobutyl or secondary butyl radicals; mono-, di- or tri- chloro- or bromo-substituted primary or secondary alkyl radicals having straight or branched chains consisting of from 5 to 12 carbon atoms; or mono-, di- or tri-chloro- or bromo-substituted cyclohexyl or cyclopentyl radicals having not more than 12 carbon atoms, and having not more than three primary, secondary or tertiary alkyl substituents containing a total of not more than 6 carbon atoms. It is desirable that such a substance be one in which not more than one, i. e., none or only one, of the radicals attached to the silicon atoms). It is desirable that such a substance be and only one of the radicals attached to the silicon atom is a haloaliphatic radical. It is most desirable that such a substance be one having the general formula

wherein $w$ is a mono-halo-substituted monovalent aliphatic radical in which the substituent is a halogen having an atomic weight between 35 and 80. The preferred substituent in the mono-halo-substituted aliphatic radical is chloro.

Examples of preferred substances that may be used in the practice of the invention include: alpha-chloroethyltrichlorosilane, beta-chloroethyltrichlorosilane, alpha-chloropropyltrichlorosilane, beta-chloropropyltrichlorosilane, gamma-chloropropyltrichlorosilane, chlorocyclohexyltrichlorosilane, alpha-chloroethylethyldichlorosilane, 1-1 dichloroethyltrichlorosilane, 1-2 dichloroethyltrichlorosilane, beta-chlorobutyltrichlorosilane, gamma-chlorobutyltrichlorosilane, delta-chlorobutyltrichlorosilane, alpha-chlorobutyltrichlorosilane, beta-chloroisobutyltrichlorosilane, and beta-chloroethylethyldichlorosilane.

Other silanes that may be used in the practice of the invention may be prepared by reaction between sulfuryl chloride or bromide and a silane having the general formula

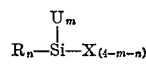

wherein $m$ is a number from 0 to 2; $n$ is an integer from 1 to 2; $(m+n)$ is from 1 to 3; X is a halo radical having an atomic weight less than 80; R is an unsubstituted saturated hydrocarbon chain, the chain being straight, branched or closed, having not more than 12 carbon atoms; and U is an unsubstituted saturated, monovalent hydrocarbon radical having not more than 12 carbon atoms. Such a reaction results in mono-chlorination or mono-bromination of the hydrocarbon chain. Further halo substitution is achieved by reacting the mono-chlorinated or -brominated silane with sulfuryl chloride or sulfuryl bromide. This second chlorination or bromination produces silanes wherein the second bromo or chloro radical is attached to the hydrocarbon chain to which is attached the first chloro or bromo radical as well as those wherein the second bromo or chloro radical is attached to a different chain. By suitable repetition of this reaction any desired silane reactant may be prepared. The products of each chlorination or bromination are separated by fractional distillation. In order to demonstrate the procedure by which such a chlorination or bromination is conducted the following method is described:

Sulfuryl chloride (432 grams) and n-propyltrichlorosilane (534 grams) are mixed and added to a one liter flask which is fitted with a reflux condenser equipped with a calcium chloride drying tube. Benzoyl peroxide (2 grams) is added to the flask which is then heated on a steam bath and maintained in gentle reflux for about 16 hours. During this refluxing sulfur dioxide and hydrogen chloride are evolved. The liquid remaining in the flask after the refluxing is cooled, and is separated into its component parts by fractional distillation through a glass column (about 18 mm. in diameter and 18 inches long) packed with glass helices. This fractionation yields 183 grams of beta-chloropropyltrichlorosilane and 98 grams of gamma-chloropropyltrichlorosilane in addition to a small amount of alpha-chloropropyltrichlorosilane.

As hereinbefore described analogous results are achieved by the use of sulfuryl bromide, and a second chloro or bromo radical can be substituted for hydrogen by repeating the reaction between sulfuryl chloride or sulfuryl bromide and one of the products of the first chlorination or bromination (e. g., alpha-chloropropyltrichlorosilane, beta-chloropropyltrichlorosilane or gamma-chloropropyltrichlorosilane). Thus, by suitable chlorination and bromination reactions it is possible to prepare any of the silane reactants hereinbefore described.

Examples of the silanes that may be chlorinated or brominated to produce substances that may be used in the practice of the invention include ethyltrifluorosilane, diethyldifluorosilane, triethylfluorosilane, n-propyltrifluorosilane, tri-n-propylfluorosilane, isopropyltrifluorosilane, n-butyltrifluorosilane, di-n-butyldifluorosilane, tri-n-butylfluorosilane, n-pentyltrifluorosilane, di-n-pentyldifluorosilane, tri-n-pentylfluorosilane, ethyldifluorochlorosilane, ethylfluorodichlorosilane, n-propyldifluorochlorosilane, n-propylfluorodichlorosilane, isopropyldifluorochlorosilane, isopropylfluorodichlorosilane, n-butyldifluorochlorosilane, n-butylfluorodichlorosilane, ethyltrichlorosilane, diethyldichlorosilane, triethylchlorosilane, ethyl-n-propyldichlorosilane, ethylisobutyldichlorosilane, n-propyltrichlorosilane, di-n-propyldichlorosilane, isopropyltrichlorosilane, n-butyltrichlorosilane, isobutyltrichlorosilane, n-pentyltrichlorosilane, isopentyltrichlorosilane, n-hexyltrichlorosilane, hexyltrichlorosilanes, dihexydichlorosilanes, n-octyltrichlorosilane, n-decyltrichlorosilane, n-dodecyltrichlorosilane, triethylbromosilane, tri-n-propylbromosilane, tri-isobutylbromosilane, cyclohexyltrichlorosilane and tri-isopentylbromosilane.

Other silanes that may be chlorinated or brominated by the procedure hereinbefore described to produce an organosilane which may be used in the practice of the present invention may be prepared by one of the following methods:

(1) A Grignard reaction between a silicon tetrahalide or an organotrihalosilane and a halo-substituted hydrocarbon in the presence of magnesium. The halo-substituted hydrocarbon and the magnesium are believed to react to produce an organo magnesium halide which then reacts with the silicon tetrahalide or organotrihalosilane. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and then the maximum output of heat generated by the reaction can be removed through the cooling means. It is usually desirable to conduct the reaction in the presence of diethyl ether as a solvent; the ether has the double effect of initiating the Grignard reaction and of facilitating control of the temperature in the reaction vessel. Examples of halo-substituted hydrocarbons that can be reacted with a silicon tetrahalide or an organotrihalosilane, in the presence of magnesium, include primary and secondary alkyl halides such as methyl bromide or chloride, ethyl bromide or chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide, 2-bromooctane, 2-iodononane, 1-bromo-3-methylnonane, 4-chloro-4-methylnonane, 5-chloro-5-methylnonane, 2-bromodecane, 1-bromo-6-methyldecane, 2-chloro-2-methyldecane, 5-chloro-5-ethyldecane, 1-bromododecane and 4-bromododecane.

(2) A reaction between an alkene having from 2 to 12 carbon atoms and a silicohaloform. Silanes that are produced by means of such reaction have alkyl radicals derived from alkenes by the addition of a hydrogen to one of the carbon atoms linked by the double bond in the alkene molecule, the free valence being attached to the other of the carbon atoms linked by the double bond in the alkene. Alkenes that can be used in such a reaction include: ethylene, propene, any butene, pentene, hexene, heptene, octene, nonene, decene, undecene, and dodecene.

In order to prepare substances, for use in the practice of the invention, having alkoxy or aroxy radicals attached to silicon, silanes prepared by either method (1) or method (2) above and chlorinated or brominated (as hereinbefore described) so that they contain a haloaliphatic radical may then be reacted with phenol (or a monoalkyl-, dialkyl-, or triaalkyl-substituted phenol in which each alkyl radical has from one to six carbon atoms, and all the alkyl radicals contain a total of not more than than six carbon atoms as hereinbefore described) or an alcohol whose molecule consists of an OH group attached to an alkyl radical having from one to four carbon atoms (i. e., methyl, ethyl, propyl, isopropyl, n-butyl, isobutyl or secondary butyl alcohol) to replace a halo radical attached to a silicon atom with an aroxy or alkoxy radical. An example of such a reaction is as follows:

The haloalkylhalosilane is placed in a flask fitted with a thermometer, a stirrer, a reflux condenser and a dropping funnel. The alcohol is placed in the dropping funnel and is added dropwise to the stirred silane (a total of about 1.02 equivalents of alcohol per equivalent of the halogen to be replaced) at such a rate that the temperature of the silane in the flask remains at about 30 degrees C.; the alcohol can be added more rapidly if the flask is cooled. When all the alcohol has been added to the flask the reaction mixture is heated to about 100 degrees C. and held, with stirring, at such temperature for about one hour. The product is recovered by fractional distillation.

Alkenyl silanes containing an alkoxy or aroxy radical also may be hydrohalogenated or hydrobrominated to produce silanes that may be used in the practice of the invention.

Siloxanes that may be used in the practice of the invention may be prepared by the hydrolysis of silanes containing a halo, aroxy, or alkoxy radical attached to a silicon atom; the resulting hydrolysis products, silanols, usually cannot be isolated and condense readily to form the

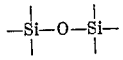

linkages of the siloxanes. An alkyl radical attached to a silicon atom in the siloxane may then be chlorinated, using molecular chlorine in the presence of ultra-violet light. The hydrolysis reaction may be conducted by slowly adding the silane dissolved in an organic solvent (such as benzene, toluene, a xylene, a hexane, a heptane, diethyl ether or an ethylpropyl ether) to a hydrolyzing solution at such a rate that the exothermic hydrolysis reaction does not cause local overheating, the hydrolyzing solution being stirred during the silane addition. The hydrolyzing solution preferably comprises from about 10 to about 15 mols of water for every equivalent of the silane to be hydrolyzed. When the hydrolyzing solution is a dilute water solution of an inorganic acid, the inorganic acid can be any mineral acid, such as hydrochloric, phosphoric or sulfuric, hydrochloric usually being preferred. An extremely dilute solution is usually preferred, e. g., one containing only a few drops of about one normal acid per mol of water. The hydrolyzing solution may also be a dilute water solution of a base, e. g., sodium hydroxide, the concentration being within the range indicated for the concentration of the inorganic acid.

Organic cross-linked silanes that can be used in the practice of the invention includes tri(dichlorosilylmethylene), trichlorosilylmethyltrichlorosilane, 1,2-bis-(trichlorosilyl)ethane, trichlorosilylethylcyclohexyltrichlorosilane, 1,6-bis-(trichlorosilyl)hexane, 1,6-bis-(trichlorosilyl) 2,5-dimethylhexane or 1,3-bis-(trichlorosilyl)-propane. Other substances that can be used are prepared by means of a Grignard reaction between such an organic cross-linked silane and an alkyl magnesium halide, a halo group attached to a silicon atom in the organic cross-linked silane being replaced by an alkyl group in this reaction. These organic cross-linked silanes may be chlorinated using ultraviolet light, the resulting haloalkyl compounds being separated by distillation.

Organic cross-linked silanes may be prepared by one of the following methods:

1. A vapor phase reaction between a silicohaloform and an organic compound having two ethylenic-type unsaturations (e. g., 1,5-hexadiene, butadiene,1,3, 1-6-heptadiene or pentadiene-1,3). The reaction is conducted either batchwise in a bomb, or continuously by passing the reactants through a reaction zone, at an elevated temperature and under super-atmospheric pressure. When the reaction is conducted in a bomb, the silicohaloform and the organic compound having two ethylenic-type unsaturations are added to the bomb, which is then sealed and heated to a temperature at which the reaction proceeds readily, e. g., to a temperature between about 275° C. and about 400° C. When the reaction is considered to be substantially complete, i. e., from about 60 to about 150 minutes after the temperature reaches about 275° C., the bomb is cooled, and the reaction products are removed from the bomb and separated by fractional distillation through a packed column.

When the vapor phase reaction is conducted continuously the silicohaloform and the organic compound are vaporized and introduced into a heated reaction zone. The reaction is conducted so that the materials remain in the heated reaction zone long enough for substantial reaction to take place and the reaction products are then cooled and collected in condensers, the collected products being separated by fractional distillation through a packed column. The reaction is usually conducted at temperatures between about 200° C. and and about 400° C., and at superatmospheric pressures as high as about 1500 pounds per square inch gauge.

2. A liquid phase reaction between a silicohaloform and an organosilane in which the organic radical has one ethylenic-type unsaturation (e. g., allyltrichlorosilane, vinyltrichlorosilane, a propenyltrichlorosilane or a butenyltrichlorosilane) in the presence of a polymerization catalyst (e. g., benzoyl acetyl peroxide). Such a reaction may be conducted in a three-necked flask fitted with a thermometer, a dropping funnel and a condenser cooled with dry ice, the outlet of which is equipped with a tube immersed in from about five to about six inches of mercury. The flask is flushed with a dry inert gas to remove all traces of oxygen and moisture, and the silicohaloform and part of the organosilane are added to the flask through the dropping funnel. The remainder of the organosilane is mixed with the polymerization catalyst and is added dropwise through the dropping funnel to the silicohaloform-organosilane mixture in the flask. The reaction products are separated by fractional distillation through a packed column.

3. Passing a vaporous alkylene halide (e. g., methylene chloride, ethylene chloride or trimethylene chloride) over a heated silicon-copper contact mass, and condensing the reaction products in condensers cooled with a water-ice mixture. The cooled reaction products are separated by fractional distillation through a packed column.

The method of the present invention includes contacting an aluminum halide in which each halogen atom has an atomic weight between 35 and 80 with a composition comprising a substance of the class hereinbefore defined, said composition containing a substance in which there is an aromatic radical having at least one nuclear hydrogen atom, in which any atom other than carbon, hydrogen, silicon and halogen consists of an oxygen atom connected to silicon, and in which any carbon atom connected to silicon is aliphatic. The substance in which there is an aromatic radical having at least one nuclear hydrogen atom, in which any atom other than carbon, hydrogen, silicon and halogen consists of an oxygen atom connected to silicon, and in which any carbon atom connected to silicon is aliphatic may be a substance of the class hereinbefore defined, so that the method of the invention may be carried out by contacting an aluminum halide with a single substance of the class hereinbefore defined in which there is an aromatic radical having at least one nuclear hydrogen atom, in which any atom other than carbon, hydrogen, silicon and halogen consists of an oxygen atom connected to silicon, and in which any carbon atom connected to silicon is aliphatic.

However, in the practice of the invention the aluminum halide preferably is contacted with a composition comprising two different substances, one of which is a substance of the class hereinbefore defined, and the other of which is a substance in which there is an aromatic radical having at least one nuclear hydrogen atom, in which any atom other than carbon, hydrogen, silicon and halogen consists of an oxygen atom connected to silicon, and in which any carbon atom connected to silicon is aliphatic, i. e., is (a) a substance whose molecule contains from one to three benzene nuclei having from 6 to 18 carbon atoms and having at least one hydrogen atom attached to a nuclear carbon atom, has a total of not more than 20 nuclear and side chain carbon atoms, has not more than five side chains, and has no substituents or has from one to five nuclear substituents each of which is a halogen of atomic weight less than 80; (Any side chain in the molecule is a monovalent or divalent aliphatic radical of not more than 6 carbon atoms. A side chain may be a closed chain which is connected either to one nuclear carbon atom or to two different nuclear carbon atoms.) or (b) a substance that is an aralkylsilane (which may be prepared by the method of the invention as hereinafter described) having a hydrogen atom attached to a nuclear carbon atom of the aryl group in the aralkyl radical. In the practice of the invention it is preferred that such a substance be one (containing an aromatic radical having at least one nuclear hydrogen atom) in which any atom other than carbon and hydrogen consists of halogen, as in the molecule of a substance (a) described above. It is most desirable that such substance contain an aromatic radical having hydrogen atoms attached to at least two adjacent nuclear carbon atoms. It is also most desirable that such substance have not more than one carbon atom in any one monovalent radical attached to an aromatic nucleus, i. e., that any side chain be methyl.

A molecule of a substance (a) described above may be an unsubstituted or nuclearly halo-substituted hydrocarbon of the benzene series having a total of not more than 14 carbon atoms in side chains, or of the naphthalene series having a total of not more than 10 carbon atoms in side chains, or of the anthracene series having a total of not more than 6 carbon atoms in side chains. The side chains, if any, are from one to five in number, and each side chain that is attached to only one nuclear carbon atom consists of a methyl, ethyl, propyl, isopropyl, n-butyl, isobutyl, secondary butyl, or tertiary butyl radical, or any alkyl radical having five or six carbon atoms, or any cycloaliphatic hydrocarbon radical having not more than six carbon atoms.

Examples of aromatic compounds that may be used in the practice of the invention include: (a) benzene, toluene, xylenes, ethylbenzene, mesitylene, methylethylbenzenes, n-propylbenzene, isopropylbenzene, n-butylbenzene, isobutylbenzene, cumene, durene, cymene, diethylbenzenes, pentamethylbenzene, amylbenzenes, butylmethylbenzenes, propyldimethylbenzenes, propylethylbenzenes, ethyltrimethylbenzenes, diethylmethylbenzenes, hexylbenzene, amylmethylbenzenes, butylethylbenzenes, terphenyls, butyldimethylbenzenes, propylethylmethylbenzene, diphenyl, dipropylbenzenes, naphthalene, 1-methylnaphthalene, 2-methyl naphthalene, 1-ethyl naphthalene, 2-ethyl naphthalene, eudalene, phenyl-naphthalene, sapotalene, tetrahydronaphthalene, anthracene, 9-methyl anthracene, 2,3-dimethyl anthracene, 2,4-dimethylanthracene, 9-ethyl anthracene, bromobenzene, o-bromotoluene, m-bromotoluene, p-bromotoluene, o-chlorotoluene, m-chlorotoluene, p-chlorotoluene, 2-chloro-m-fluorotoluene, 2,6-dichlorotoluene, 4-bromo-o-xylene, dichloroxylene, 4-bromo-m-xylene, 5-bromo-m-xylene, 2-bromo-p-xylene, 3-bromo-pseudocumene, 5-bromopseudocumene, 6-bromopseudocumene, 2-bromo-mesitylene, 3-bromo-o-xylene, 2-bromo-1-ethyl benzene, 4-bromo-1-ethyl benzene, 4-bromo-1,3-diethyl benzene, 6-bromo-3-ethyl toluene, 2-bromo-4-ethyl toluene, 4-bromo-1-propyl benzene, 4-bromo-1-isopropyl benzene, 4-bromo-1-methyl-3-isopropyl benzene, 6-bromo-1-methyl-3-isopropyl benzene, 2-bromo-p-cymene, 3-bromo-p-cymene, 4-bromo-1-butyl benzene, 4-bromo-1-tertiary butyl benzene, 4-bromo-1- isoamyl benzene, 4-bromo-1-tertiary amyl benzene, chlorobenzene, 1-chloro-4-fluorobenzene, 1-chloro-4-ethylbenzene, 1-chloro-4-propylbenzene, 1,2 dichloro - 4 - ethylbenzene, alpha-bromonaphthalene, beta-bromonaphthalene, 2-chloronaphthalene, 1-bromo-3-chloronaphthalene, 2-chloro-1-methyl naphthalene, 1-bromo-8-methyl naphthalene, 1-bromo-7-methyl naphthalene, 7-chloro-1-methyl naphthalene, 1-bromo-2-methyl naphthalene, 4-bromo-2-methyl naphthalene, 8 - bromo - 2 - methyl naphthalene, 1-bromo-5-methyl naphthalene, 1 - bromo - 2,7 - dimethyl naphthalene, 4-bromo-1,6-dimethyl naphthalene, 1 - bromo - 2,6 - dimethyl naphthalene, 4-bromo-1,2-dimethyl naphthalene, 1-bromo-2,3-dimethyl naphthalene, 1-bromo-4-methyl naphthalene and 7-bromo-1-methyl naphthalene, 1,10-dibromoanthracene, 9,10-dichloroanthracene, indane, acenaphthene, benzonaphthene, phenanthrene, tetrahydrophenanthrene, 3-methyl phenanthrene, retene, cyclopentanthracene, 1,4-dimethylphenanthrene, as well as (b) compounds prepared by the present method as herein described.

In the practice of the invention choloralkylsilanes having chlorine in the beta position on the alkyl group are most reactive, followed by those having chlorine in the gamma position and then by those having chlorine in the alpha position in decreasing order. Benzene, chlorobenzene, and toluene react equally well with the beta chloroalkylchlorosilanes. Benzene ordinarily does not react at reflux temperatures with alpha or gamma chloroalkylsilanes, probably because the reflux temperature of benzene is not sufficiently high to initiate reaction with the less reactive alpha and gamma chlorine atoms. Slight pressure may be used in order to allow higher reaction temperatures. Toluene, however, differs from benzene in that it reacts at reflux temperature with the alpha and gamma chloro compounds. The fact that toluene has a higher boiling point as well as the possibility that toluene is more reactive than benzene accounts for this difference.

Aromatic hydrocarbons having alkyl side chains longer than one carbon atom can be reacted by the method of the invention, but ordinarily no definite product can be isolated due to migration and redistribution of the alkyl side chains by the action of the aluminum halide. For example, the reaction of ethyl benzene with beta chloroethyltrichlorosilane gives no definite compound. The reaction results in the production of a mixture of compounds having no definite boiling point on distillation. The aluminum halide rearranges the ethyl side chains on the benzene ring so that a mixture of mono- and poly-ethyl benzenes, phenylethyltrichlorosilanes and ethylphenylethyltrichlorosilanes is formed. It is for this reason that it is preferable that methyl radicals be the only side chains on aromatic nuclei of substances employed in the present method.

In the following description of the procedure by which the present method is carried out, it is assumed that the two molecules which react together are molecules of two different substances, although, as hereinbefore explained, it is possible in the present method to use a single substance, whose molecules react with one another in the presence of the aluminum halide. In the following description of the procedure it is assumed also that only one of the two reacting molecules has a halo group in an aliphatic radical and that only the other reacting molecule contains an aromatic nucleus having a nuclear hydrogen atom. If a substance used in the present method has a molecule that contains both a nuclear hydrogen atom and a haloaliphatic radical, the molecules of such a substance are likely to react with one another to produce a resinous product having a chain-like molecule. This is the case when the aluminum halide is contacted with only a single substance, whose molecules react with one another.

The procedure for adding the aluminum halide to the mixture of haloalkylsilane and aromatic compound is dependent upon the vigor with which these substances react, as evidenced by the evolution of HCl. The total charge of the aluminum halide may be added to the mixture at room temperature in small portions over a period of from 20 to 45 minutes, and then the mixture may be refluxed for 15 or 20 minutes to complete the reaction and to drive off HCl. Usually, the first portion of the aluminum halide (¼ to ⅓ of the total amount to be added) is added very carefully at room temperature to the reaction mixture, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions.

When the concentration of the aluminum halide is maintained at the minimum amount necessary for reaction, it is possible to isolate the pure product by double distillation. Distillation of the reaction mixture in the presence of the aluminum halide, however, always involves the danger of decomposition or rearrangement of the desired product as well as contamination of the distillate with the aluminum halide. It is usually desirable, therefore, to remove the catalyst before distillation, and use of a large excess of the aluminum halide should be avoided. The aluminum halide should not be added in excess of about 5 mole per cent (based on the amount of haloalkylsilane present in the reaction mixture). It is preferable to use not more than about 3 mole per cent and most desirable that the amount of the aluminum halide used be not more than about 2 mole per cent based on the amount of haloalkylsilane. An amount of the aluminum halide less than about .3 mole per cent ordinarily is ineffective although smaller amounts can be used in some cases at slightly elevated temperatures, and it is preferable to use at least about .5 mole per cent and most desirable that the amount of the aluminum halide used be not less than about .75 mole per cent.

For example, aluminum chloride may be removed from the reaction mixture before distillation by a procedure which involves the addition of phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107° C.). After further cooling, an amount of a hydrocarbon solvent equal to the volume of the reaction mixture is added to precipitate the $AlCl_3.POCl_3$ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the $AlCl_3.POCl_3$ complex. An absorbing agent such as kieselguhr may be added in place of the hydrocarbon solvent to absorb the $AlCl_3.POCl_3$ complex and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the $AlCl_3.POCl_3$ complex.

The method of the invention may be conducted as a continuous process either by (1) employing a contacting tower and passing the mixture of aromatic compound and haloalkylsilane over the aluminum halide or over an inactive material such as porous porcelain impregnated with the aluminum halide or by (2) suspending the finely-divided aluminum halide in the mixture of aromatic compound and haloalkylsilane and allowing the material to remain in a heated reaction zone long enough for substantial reaction to take place. Either method is then followed by whatever procedure is desired for removing the aluminum halide.

In the practice of the invention an excess of aromatic compound over haloalkylsilane may be used to obtain a high yield of the desired reaction product. The minimum ratio of reactants is that below which a substantial yield of the desired product is not obtained. It is preferred that the amount of aromatic compound be not less than about two moles per mole of haloalkylsilane and most desirable that the molar ratio of aromatic compound to haloalkylsilane be about 3 to 1. When the molar ratio of aromatic compound to haloalkylsilane is much larger than 3 to 1, the reaction may need to be conducted at increased pressure. For example, an experiment using a 5 to 1 molar ratio of benzene to beta-chloroethyltrichlorosilane gave no reaction upon refluxing with 1.12 mole per cent of aluminum chloride. Evidently, the 5 to 1 ratio lowers the pot temperature below that necessary for reaction, i. e., such a large excess of benzene causes the pot temperature to be approximately the boiling temperature of benzene which is too low for the reaction to take place. The same experiment may be successfully conducted at increased pressure. Although at increased pressures a high yield of the desired product may be obtained using any large excess of aromatic compound over haloalkylsilane, the desirable maximum ratio is that above which the yield of the product is not increased so that the process is sufficiently economically feasible from the stand-point of time, since the excess aromatic compound must be distilled (along with the hydrocarbon solvent if any is used) from the reaction mixture before distillation to obtain the pure organosilane. It is desirable, therefore, that the molar ratio of aromatic compound to haloalkylsilane be not greater than about 7 to 1.

When an alkoxy or aroxy silane is used in the practice of the invention, the presence of the aluminum halide tends to cause such silane to condense to a siloxane. Such condensation can be minimized by keeping the temperature and concentration of the aluminum halide as low as possible and by continuing the reaction for as short a period of time as possible. When a silanol is used in the practice of the invention, the presence of the aluminum halide causes it to condense to a siloxane. Thus, in all these cases, formation of a siloxane takes place, at least to some extent, and one of the reaction products is the substance that would have been obtained if the siloxane had been introduced at the outset as one of the starting materials.

Since aluminum chloride forms a complex with oxygen containing compounds, a mole of aluminum chloride must be added for every gram atom of oxygen present when an aroxy or alkoxy silane, a silanol or a siloxane is used in the practice of the invention, in addition to the amount of aluminum chloride required as a catalyst in the reaction.

The reaction product of a siloxane may be washed with water to remove the aluminum chloride. If the product contains any halo or alkoxy or aroxy radicals connected to silicon, such radicals are hydrolyzed by washing the product with water, but in a number of cases such hydrolysis during the removal of the aluminum chloride is not objectionable.

The method of the present invention may be used to produce a wide variety of organosilanes, among which are compounds of the invention, each of which has in its molecule an aromatic nucleus having a connection to a silicon atom through more than two aliphatic carbon atoms in series, each carbon atom that is connected to a silicon atom being aliphatic and any atom other than carbon, hydrogen, silicon and halogen consisting of an oxygen atom connected to silicon. A tolylcyclohexyltrichlorosilane having the following structural formula.

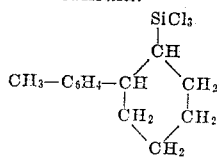

is a compound of the invention because the aromatic nucleus has a connection to the silicon atom through 6 aliphatic carbon atoms in series in addition to another connection through 2 aliphatic carbon atoms in series.

An organosilicon compound of the invention can be obtained by reacting by the present method (1) a molecule of any silane hereinbefore described that contains a chloro or bromo group attached to an aliphatic carbon atom which in turn has a connection to a silicon atom through two or more aliphatic carbon atoms in series and (2) a molecule (which may be the same as or different from the first molecule) of any substance hereinbefore described in which there is an aromatic radical having at least one nuclear hydrogen atom. Thus a compound of the invention may be obtained by reacting by the method of the invention as hereinbefore described a molecule of any substance hereinbefore described in which there is an aromatic radical having at least one nuclear hydrogen atom with (a) a substance whose molecule consists of a silicon atom to which are attached four monovalent radicals, at least one of which is a haloaliphatic radical in which at least one halo substituent is connected to a carbon atom which has a connection to a silicon atom through two or more aliphatic carbon atoms in series (e. g., a gamma-chloro- or gamma-bromo-substituted propyl, n-butyl, isobutyl, secondary butyl, or other primary or secondary alkyl radicals having from 5 to 12 carbon atoms; or a chloro- or bromo-substituted cyclopentyl or cyclohexyl radical in which the halo substituent is on any carbon atom); from one to three of which may be halogens each having an atomic weight less than 80; and the remainder of which, if any, may be unsubstituted organic radicals (as hereinbefore defined) or hydroxy radicals; or (b) a substance whose molecule consists of from two to three silicon atoms connected by from one to three divalent hydrocarbon or halo-substituted hydrocarbon radicals, each remaining silicon valence being attached to a halogen having an atomic weight less than 80 or a monovalent organic radical or a hydroxy radical, said molecule containing from one to three halogens each of which has an atomic weight between 35 and 80 and is present in a monovalent or divalent or trivalent aliphatic radical, and at least one of which is attached to a carbon atom having a connection to a silicon atom through two or more aliphatic carbon atoms in series; said monovalent organic radicals being otherwise unsubstituted or (c) a siloxane formed from one or more of the substances (a) and (b), e. g., by hydrolysis and condensation.

A preferred compound of the invention is one whose molecule contains only one silicon atom, i. e., a compound obtained by reacting by the method of the invention a substance in which there is an aromatic radical having at least one nuclear hydrogen atom and in which any atom other than carbon and hydrogen consists of halogen with a substance whose molecule contains only one silicon atom (i. e., a substance as described in (a) above). A desirable compound of the invention is one having the general formula $$vSiCl_3$$

wherein $v$ is a monovalent radical in which any atom other than carbon and hydrogen consists of halogen and in which there is an aromatic nucleus having a connection to the silicon atom through more than two aliphatic carbon atoms in series. A most desirable compound of the invention is one having the general formula just defined in which there is not more than one carbon atom in any one monovalent radical attached to an aromatic nucleus (i. e., any side chain on the aromatic nucleus is methyl) since, as hereinbefore stated, any compound of the invention containing an aromatic radical having a side chain longer than one carbon atom is ordinarily obtainable only in the form of a mixture.

A compound of the invention that is polymeric may be obtained by a reaction between two molecules which are both at least bi-functional. For example, such a compound is formed by a reaction between an organosilicon compound having more than one haloaliphatic radical (such haloaliphatic radical being as defined in (a) above), or having only one such haloaliphatic radical containing more than one halo group, and an aromatic compound having more than one nuclear hydrogen atom, or by a reaction between two identical molecules of an organosilicon compound having both a haloaliphatic radical as described in (a) above and an aromatic radical containing a nuclear hydrogen atom. Such resinous compounds, however, cannot be isolated from the reaction mixture by distillation.

The preferred organosilicon compounds of the invention include gamma-tolylpropyltrichlorosilanes, gamma-tolylbutyltrichlorosilanes, gamma-phenylpropyltrichlorosilane, tolylcyclohexyltrichlorosilanes, and phenylcyclohexyltrichlorosilanes.

The method of the invention may be carried out by one of the procedures described in the following examples:

Example 1

An alkyltrihalosilane is chlorinated by means of a reaction with molecular chlorine according to the following procedure: An alkyltrihalosilane (357 grams of cyclohexyltrichlorosilane) is placed in a glass tube approximately three feet in length, having an internal diameter of about 50 mm., packed at the bottom with Raschig rings (to a height of about 5 cm.) and fitted with a gas inlet tube (having an internal diameter of about 6 mm.) which is sealed through the bottom of the tube so that the chlorine is discharged from a vertical section of this tube (near the bottom of the reactor) into the alkyltrihalosilane. The top of the reactor tube is fitted with a Dry-Ice condenser and a glass tube which conducts any gases not condensed in the Dry-Ice condenser to a water scrubber where the HCl formed by the chlorination is removed. The amount of HCl absorbed in the water scrubber is determined by titration with sodium hydroxide. Into the silane (which is at a temperature of about 25 degrees C.) is introduced chlorine (at a temperature of about 25 degrees C.) for about 100 minutes at such a rate that about 1.67 mols of hydrogen chloride are collected in the water scrubber during the 100 minutes. The liquid remaining in the reactor is separated by fractional distillation to yield cyclohexyltrichlorosilane (112 grams) and a mixture of chlorocyclohexyltrichlorosilanes (174 grams) boiling in the range between 108 degrees C. and 111 degrees C. at an absolute pressure of 6 mm. of mercury. By a similar procedure butyltrichlorosilanes are chlorinated.

The procedure described in the preceding paragraph is repeated to chlorinate a siloxane (207 grams of hexaethyldisiloxane). Chlorine is admitted into the reactor until the theoretical amount of hydrogen chloride necessary to chlorinate the siloxane (1 mol) has been collected in the water scrubber. Fractional distillation of the liquid in the reactor yields in addition to unreacted hexaethyldisiloxane a mixture of chloroethyldisiloxanes (51 grams) boiling in the range 117–123 degrees C. at 7 mm. of Hg and a fraction (29 grams) boiling within the range 138 to 143 degrees C. at 7 mm. Hg. This latter fraction is believed to be beta-chloroethylpentaethyldisiloxane.

An aromatic hydrocarbon is reacted with a haloalkylsilane using an aluminum halide as a catalyst according to the following procedure:

(a) A haloalkylsilane (75 grams of beta-chlorobutyltrichlorosilane) and an aromatic hydrocarbon (92 grams of toluene) are placed in a 500 ml. three-necked flask equipped with a mercury sealed stirrer and a reflux condenser fitted with a calcium chloride tube. The mixture is stirred and an aluminum halide (0.5 gram of aluminum chloride) is added to the mixture in small portions over a period of 20 minutes. The reaction is slightly exothermic accompanied by copious evolution of HCl. After the entire amount of aluminum chloride has been added, the mixture is stirred and refluxed for 15 minutes to complete reaction and drive off HCl.

The reaction mixture is then placed in a Claisen flask and heated at about 111 degrees C. at atmospheric pressure to distill toluene (70 grams). The distillation is then continued under reduced pressure to obtain a crude beta-tolylbutyltrichlorosilane (58 grams), B. P. 173–176 degrees C. at 36 mm. Hg (i. e., boiling within the range from 173–176 degrees C. at an absolute pressure of 36 mm. of mercury). This crude product is then redistilled under reduced pressure to give a water white beta-tolylbutyltrichlorosilane, B. P. 122–123 degrees C. at 1.5 mm. Hg.

(b) An aromatic hydrocarbon (138 grams of toluene) is reacted with a haloalkylsilane (106 grams of beta-chloropropyltrichlorosilane) by the procedure given in (a) except that the aluminum chloride (0.5 gram) is added in small quantities over a period of 45 minutes. Distillation under reduced pressure yields a crude beta-tolylpropyltrichlorosilane (60 grams), B. P. 173–176 degrees C. at 52 mm. Hg. Redistillation under reduced pressure yields a water white beta-tolylpropyltrichlorosilane, B. P. 124–125 degrees C. at 3 mm. Hg.

(c) An aromatic hydrocarbon (78 grams of benzene) is reacted with a haloalkylsilane (71 grams of beta-chloropropyltrichlorosilane) by the procedure given in (a) except that the aluminum chloride (0.5 gram) is added in small quantities over a period of 25 minutes, and after addition of the aluminum chloride is completed, the mixture is refluxed for 20 minutes. Distillation under reduced pressure yields beta-phenylpropyltrichlorosilane (60 grams), B. P. 165–168 degrees C. at 70 mm. Hg. Redistillation under reduced pressure yields water white beta-phenylpropyltrichlorosilane, B. P. 110–111 degrees C. at 2 mm. Hg.

(d) An aromatic hydrocarbon (92 grams of toluene) is reacted with a haloalkylsilane (63.8 grams of beta-chloroethylethyldichlorosilane) by the procedure given in (a) except that the mixture is heated while the aluminum chloride (0.53 gram) is added in small portions over a period of 20 minutes and after the addition of AlCl₃ is completed, the mixture is refluxed for two hours. Distillation under reduced pressure yields a beta-tolylethylethyldichlorosilane, B. P. 124–125 degrees C. at 1 mm. Hg.

(e) An aromatic hydrocarbon (113 grams of chlorobenzene) is reacted with a haloalkylsilane (66½ grams of beta-chloroethyltrichlorosilane) by the procedure given in (a) except that after addition of the aluminum chloride (0.53 gram) the mixture is refluxed for one hour. Distillation under reduced pressure yields a beta-(chlorophenyl)ethyltrichlorosilane (48 grams), B. P. 156–166 degrees C. at 23 mm. Hg. Redistillation gives a colorless product, B. P. 118–119 degrees C. at 1 mm. Hg.

(f) A haloalkylsilane (105 grams of alpha-chloroethyltrichlorosilane) and an aromatic hydrocarbon (138 grams of toluene) are reacted by the same procedure given in (a) except that after the addition of the aluminum chloride (0.8 gram) the mixture is refluxed for one hour. Distillation of the reaction mixture from a Claisen flask under reduced pressure yields an alpha-tolylethyltrichlorosilane (35 grams), B. P. 174–178 degrees C. at 70 mm. Hg. Redistillation of this product under reduced pressure yields a colorless alpha-tolylethyltrichlorosilane, B. P. 109–110 degrees C. at 2 mm. Hg.

(g) A haloalkylsilane (99 grams of mixed alpha- and beta-chloroethyltrichlorosilane) and an aromatic hydrocarbon (182 grams of trichlorobenzene) are placed in a 500 ml. three-necked flask equipped with a mercury sealed stirrer and a reflux condenser fitted with a calcium chloride tube. Aluminum chloride (0.35 gram, i. e., one-half the total charge of 0.7 gram to be added) is added and the mixture stirred and refluxed for three quarters of an hour (the reaction begins rather sluggishly at a temperature of about 115 degrees C., and HCl is evolved at a moderate rate) after which time the remainder of the aluminum chloride (0.35 gram) is added. The stirring and heating of the mixture is continued (for about an hour and 45 minutes) until the evolution of HCl ceases. The reaction mixture is then placed in a Claisen flask and excess trichlorobenzene is distilled under reduced pressure. Distillation is continued to obtain a mixed alpha- and beta - (trichlorophenyl)ethyltrichlorosilane (45 grams), B. P. 166–168 degrees C. at 2 mm. Hg.

(h) A haloalkylsiloxane (25 grams of beta-chloroethylpentaethyldisiloxane) and an aromatic hydrocarbon (25 grams of toluene) are mixed in a 500 ml. three-necked flask equipped with a mercury sealed stirrer and reflux condenser fitted with a calcium chloride tube. The mixture is heated and then aluminum chloride (12.12 grams) is added in small portions. The mixture is then refluxed (for about 3 hours) until evolution of HCl ceases. The reaction mixture is then poured into ice water (500 grams in a separatory funnel) and isopropyl ether (100 ml.) is added to extract the resulting mixture. The ether layer is separated from the water layer and the water layer is re-extracted with isopropyl ether (100 ml.). The ether layer is separated and added to the first ether extract. The combined isopropyl ether extracts are washed with 100 ml. of distilled water (2 portions of 50 ml. each) and are then dried over calcium chloride over night. The liquid is then filtered from the drying agent and the filtrate is placed in a Claisen flask. The ether and excess toluene are distilled and the residue is distilled under reduced pressure to yield a luminescent liquid (7 grams), B. P. 165–172 degrees C. at 45 mm. Hg, presumably beta-(tolylethyl)pentaethyldisiloxane.

(i) An aromatic hydrocarbon (92 grams of toluene) is reacted with a haloalkylsilane (63.8 grams of alpha-chloroethylethyldichlorosilane) by the procedure given in (d). Distillation under reduced pressure yields an alpha-tolylethylethyldichlorosilane (6 grams), B. P. 139–140 degrees C. at 6 mm. Hg.

(j) A haloalkylsilane (51 grams of beta-chloroisobutyl-trichlorosilane) and an aromatic hydrocarbon (62 grams of toluene) are mixed in a 500 ml. three-necked flask equipped with a mercury sealed stirrer and a reflux condenser fitted with a calcium chloride tube. Aluminum chloride (0.36 gram) is added to the stirred mixture in small portions over a period of one hour and fifteen minutes, the mixture being gently heated during the addition of the aluminum chloride. Distillation under reduced pressure yields a crude beta-tolylisobutyltrichlorosilane (27 grams), B. P. 147–178 degrees C. at 17 mm. Hg. This product is redistilled under reduced pressure to yield a colorless beta-tolylisobutyltrichlorosilane, B. P. 123–124 degrees C. at 1 mm. Hg.

*Example 2*

In the following procedures for reacting an aromatic hydrocarbon with a haloalkylsilane using an aluminum halide as a catalyst, the aluminum halide (aluminum chloride) is removed by the use of phosphorus oxychloride.

A haloalkylsilane (198 grams of alpha-chloroethyltrichlorosilane) and an aromatic hydrocarbon (226 grams of chlorobenzene) are placed in a 2 liter three-necked flask fitted with a stirrer and a reflux condenser. Aluminum chloride (⅔ gram, i. e., about ⅓ of the total amount of 2 grams to be added) is added and the mixture is stirred and heated at gentle reflux for 20 minutes. (Evolution of HCl commences when the liquid approaches the reflux point). The heating is discontinued and the remainder of the aluminum chloride (1⅓ grams) is added to the reaction mixture. When the vigorous evolution of HCl subsides (after about 10 minutes), heating is again continued and the mixture is stirred and refluxed for about 3 hours. Heat is then removed. Phosphorus oxychloride (3.1 grams) is added to the hot mixture to complex the aluminum chloride. The mixture is cooled, and an equal volume of hydrocarbon solvent (425 ml. "Sohio S. R." solvent, a petroleum fraction of a hydrocarbon solvent composed mainly of aliphatic hydrocarbon material, boiling within the range 100 to 286 degrees F.) is added to precipitate the AlCl₃.POCl₃ complex. The mixture is allowed to stand for approximately 16 hours. The mixture is then filtered and the filtrate is placed in a one liter Claisen flask. The hydrocarbon solvent and unreacted chlorobenzene are then distilled at atmospheric pressure. The residue is distilled under reduced pressure and a fraction (180 grams), B. P. 125–170 degrees C. at 2 mm. Hg is recovered. This fraction is redistilled to yield a water white alpha-(chlorophenyl)ethyltrichlorosilane (158 grams), B. P. 126–128 degrees C. at 2 mm. Hg.

A haloalkylsilane (233 grams of alpha, beta-dichloroethyltrichlorosilane) and an aromatic hydrocarbon (565 grams of chlorobenzene) are placed in a two liter three-necked flask equipped with a mercury sealed stirrer and a reflux condenser fitted with a calcium chloride tube. Aluminum chloride (0.66 gram, i. e., about ¼ of the total of 2.66 grams to be added) is added and the mixture is stirred and heated to gentle reflux. The reaction mixture becomes colored and evolution of HCl commences. The refluxing is discontinued after 15 minutes and about half the remainder of the aluminum chloride (1 gram) is then added. The evolution of HCl is so vigorous that some chlorobenzene is lost and the flask is cooled. After the vigorous reaction subsides, the mixture is refluxed for one-half hour. Refluxing is discontinued and the remainder of the aluminum chloride (1 gram) is added. Refluxing is again continued for about 3¼ hours, making the total heating period about 4 hours. Heat is then removed and phosphorus oxychloride (about 3.1 grams) is added to complex the aluminum chloride. When the temperature of the mixture is about 50 degrees C., kieselguhr (25 grams) is added to absorb the AlCl₃.POCl₃ complex. The mixture is allowed to stand until it reaches room temperature. It is then filtered and the filtrate is placed in a 1 liter Claisen flask. The excess chlorobenzene is distilled at atmospheric pressure, and the residue is then distilled under reduced pressure; a fraction (212 grams), B. P. 195–210 degrees C. at 1 mm. Hg is recovered. This fraction is redistilled twice to remove traces of AlCl₃. The final reduced pressure distillation yields a light brown, viscous alpha, beta-di(chlorophenyl)ethyltrichlorosilane with a purple fluorescence, B. P. 194–200 degrees C. at 0.5 to 1 mm. Hg.

A haloalkylsilane (405 grams of beta-chloropropyltrichlorosilane) and an aromatic hydrocarbon (850 grams of o-di-chlorobenzene) are placed in a two liter three-necked flask equipped with a mercury sealed stirrer and a reflux condenser fitted with a calcium chloride tube. Aluminum chloride (1.2 grams, i. e., about one third of the total amount of 3.7 grams to be added) is added and the mixture is stirred and heated gently for about 45 minutes. (Evolution of HCl commences when the temperature is about 80 degrees C.) The heating is then discontinued and a second portion of AlCl₃ (1.2 grams) is added. The evolution of HCl becomes so vigorous that the flask is cooled. After the reaction subsides, the remainder of the AlCl₃ (1.3 grams) is added and the mixture is stirred and heated sufficiently that evolution of HCl continues. After two hours the heating is discontinued and POCl₃ (4.5 grams) is added to complex the AlCl₃. When the reaction mixture has cooled, it is poured into a hydrocarbon solvent (1250 ml. of "Sohio S. R. Solvent") and the resulting mixture is allowed to stand for 24 hours at a temperature of 30 degrees F. to precipitate the AlCl₃ complex. The liquid is then decanted from the mixture into a Claisen flask, leaving a dark residue containing the AlCl₃.POCl₃ complex. The hydrocarbon solvent is distilled at atmospheric pressure. The excess o-dichlorobenzene (473 grams) is then distilled under reduced pressure. The residue is then distilled under reduced pressure and a fraction (450 grams), B. P. 138–150 degrees C. at 1 mm. Hg is recovered. This fraction is redistilled at reduced pressure to give an almost colorless beta-(dichlorophenyl)propyltrichlorosilane, B. P. 143–145 degrees C. at 1 mm. Hg.

A haloalkylsilane (66 grams of beta-chloroethyltrichlorosilane) and an aromatic hydrocarbon (147 grams of o-dichlorobenzene) are placed in a 500 ml. three-necked flask equipped with a mercury sealed stirrer, a reflux condenser fitted with a calcium chloride tube, and a thermometer immersed in the liquid. Aluminum chloride (0.35 gram, i. e., about one-half the total amount of 0.69 gram to be added) is added and the mixture is stirred and heated for about 20 minutes. (Evolution of HCl commences when the temperature of the reaction mixture reaches 118 degrees C.) Heating is discontinued while the remainder of the aluminum chloride (0.34 gram) is added and then the mixture is again stirred and refluxed for 1½ hours. The temperature of the liquid does not go over 135 degrees C. Heat is removed and the mixture is cooled to about 95 degrees C. Phosphorus oxychloride (0.76 gram) is added to the mixture which is then placed in a Claisen flask. Unreacted o-dichlorobenzene is distilled under reduced pressure. The distillation is then continued and a fraction (56 grams), B. P. 120–132 degrees C. at 1 mm. Hg. is recovered. This product is redistilled under reduced pressure to yield a water white beta-(dichlorophenylethyltrichlorosilane), B. P. 136–138 degrees C. at 2 mm. Hg.

A haloalkylsilane (126 grams of alpha, beta-dichloroethyltrichlorosilane) and an aromatic compound (62.5 grams of naphthalene) are placed in a 500 ml. three-necked flask equipped with a mercury sealed stirrer and a reflux condenser fitted with a calcium chloride tube. Aluminum chloride (0.4 gram, i. e., about one-third of the total amount of 1.3 grams to be added) is added and the mixture is stirred and heated for about 15 minutes. Heating is discontinued; the remainder of the aluminum chloride (0.9 gram) is added. About 5 minutes after the aluminum chloride addition a vigorous reaction ensues and the flask is cooled to slow the reaction. When vigorous reaction ceases, heating is continued for about 3½ hours, making the total time for reaction about 4 hours. Heating is then discontinued and POCl₃ (about 2.3 grams) is added to the hot mixture. The reaction mixture is allowed to cool. An equal volume of a hydrocarbon solvent (190 ml. of "Sohio S. R. Solvent") is added and the mixture is allowed to stand for 2 hours. The liquid is then decanted from the mixture into a Claisen flask. The hydrocarbon solvent is distilled and the residue is then distilled under reduced pressure to yield unreacted naphthalene (only a few grams). Hot water is run through the condenser to prevent solidification of the naphthalene. Continued heating results only in gradual decomposition of the residue. The residue is a thick, viscous black tar that sets to a hard, brittle, resinous material on cooling.

The reaction between naphthalene and alpha, beta-dichloroethyltrichlorosilane in the presence of aluminum chloride may take either of two possible courses. It may form a three ring compound or a linear polymer.

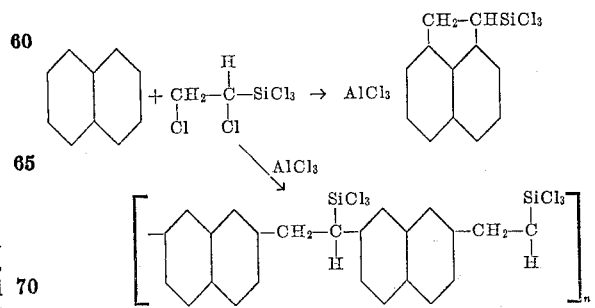

Evidently, in the reaction described herein the polymer forming reaction has taken place rather than that of ring closure.

Example 3

The following procedures further illustrate the practice of the invention:

A haloalkylsilane (106 grams of gamma-chloropropyltrichlorosilane) and an aromatic hydrocarbon (138 grams of toluene) are mixed in a 500 ml. three-necked flask equipped with a mercury sealed stirrer and a reflux condenser fitted with a calcium chloride tube. Aluminum chloride (0.25 gram, i. e., one-half of the total amount of 0.5 gram to be added) is added in small portions to the mixture. Evolution of HCl is very slow. Forty minutes after the aluminum chloride is added, the mixture is heated until the toluene starts to reflux. The rate of evolution of HCl increases when this heating is started. Heating is continued for one hour during which time the remainder of the aluminum chloride (0.25 gram) is added in small portions. The reaction mixture is then placed in a Claisen flask and distilled under reduced pressure to yield a gamma-tolylpropyltrichlorosilane (30 grams), B. P. 178–180 degrees C. at 50 mm. Hg. This product is redistilled under reduced pressure and a water white gamma-tolylpropyltrichlorosilane, B. P. 126–127 degrees C. at 1.5 mm. Hg is recovered.

By the above procedure gamma-chlorobutyltrichlorosilane (56 grams) is reacted with toluene (79 grams) in the presence of aluminum chloride (0.4 gram), distillation of the reaction mixture under reduced pressure yielding a gamma-tolylbutyltrichlorosilane (12 grams), B. P. 188–195 degrees C. at 52 mm. Hg. Redistillation of this product yields a water white gamma-tolylbutyltrichlorosilane, B. P. 121–122 degrees C. at 1.5 mm. Hg.

A haloalkylsilane (78 grams of a chlorocyclohexyltrichlorosilane) and an aromatic hydrocarbon (86 grams of toluene) are mixed in a 500 ml. three-necked flask equipped with a mercury sealed stirrer and a reflux condenser fitted with a calcium chloride tube. Aluminum chloride (0.45 gram) is added to the stirred mixture in small portions over a period of twenty minutes. Heat is applied during the last ten minutes of the addition to bring the toluene to reflux. The mixture is refluxed for about one hour. The reaction mixture is distilled under reduced pressure to yield a crude tolylcyclohexyltrichlorosilane (65 grams), B. P. 193–196 degrees C. at 14 mm. Hg. This product is redistilled under reduced pressure to yield a water white tolylcyclohexyltrichlorosilane, B. P. 159–160 degrees C. at 2 mm. Hg.

A haloalkylsilane (66½ grams of beta-chloroethyltrichlorosilane) and an aromatic hydrocarbon (78 grams of benzene) are mixed in a 500 ml. three-necked flask equipped with a mercury sealed stirrer and a reflux condenser fitted with a calcium chloride tube. Aluminum chloride (0.55 gram) is added to the stirred mixture in small portions. The mixture is heated gently for about twenty minutes. The heating is then discontinued for twenty minutes during which time HCl is evolved vigorously. The mixture is again heated for 35 minutes before distilling under reduced pressure to yield crude beta-phenylethyltrichlorosilane (52 grams), B. P. 164–174 degrees C. at 80 mm. Hg. This product is redistilled under reduced pressure to yield colorless beta-phenylethyltrichlorosilane, B. P. 107–108 degrees C. at 2 mm. Hg.

The procedure described in the preceding paragraph is repeated except that the amount of aluminum chloride is increased to .87 gram. Distillation of the reaction mixture yields beta-phenylethyltrichlorosilane which is contaminated with aluminum chloride. The aluminum chloride is then removed by adding to the hot reaction product phosphorus oxychloride (about 1.02 grams). The mixture is cooled and an equal volume of a hydrocarbon solvent (about 65 ml. of "Sohio S. R. Solvent") is added to precipitate the AlCl$_3$.POCl$_3$ complex. The mixture is allowed to stand for approximately 16 hours and is then filtered. The filtrate is placed in a one liter Claisen flask and distilled to yield colorless beta-phenylethyltrichlorosilane, (57.5 grams), B. P. 107–108 degrees C. at 2 mm. Hg.

When the procedure described in the preceding paragraph is repeated increasing the amount of aluminum chloride to 1.32 grams and using about 1.53 grams of phosphorus oxychloride to form a complex with the aluminum chloride in the reaction product, the final distillation yields colorless beta-phenylethyltrichlorosilane (76 grams), B. P. 107–108 degrees C. at 2 mm. Hg.

A haloalkylsilane (66½ grams of beta-chloroethyltrichlorosilane) and an aromatic hydrocarbon (106 grams of ethylbenzene) are mixed in a 500 ml. three-necked flask equipped with a mercury sealed stirrer and a reflux condenser fitted with a calcium chloride tube. Aluminum chloride (0.55 gram) is added to the stirred mixture in small portions. The mixture is heated gently for about twenty minutes. The heating is then discontinued for twenty minutes during which time HCl is evolved vigorously. The mixture is again heated for 35 minutes before distilling under reduced pressure. The distillation yields a material with no definite boiling point containing a mixture of mono- and poly-ethyl benzenes, phenylethyltrichlorosilane, and ethylphenylethyltrichlorosilanes.

A haloalkylsilane (176 grams of a chlorocyclohexyltrichlorosilane) and an aromatic hydrocarbon (156 grams of benzene) are mixed in a one liter three-necked flask equipped with a mercury sealed stirrer and a reflux condenser fitted with a calcium chloride tube. Aluminum chloride (0.59 gram, i. e., about one-third of the total charge of 178 grams to be added) is added and the mixture is stirred and heated for a total reaction time of 2 hours, during which time the remainder of the aluminum chloride (1.19 grams) is added in two approximately equal portions, one about twenty and the other about forty minutes after heating is started. Evolution of HCl commences as the benzene nears its boiling point. At the end of the reaction period POCl$_3$ (2.1 grams) is added to the hot mixture to complex the AlCl$_3$. Unreacted benzene (72 grams) is then recovered by distilling the reaction mixture to a vapor temperature of 85 degrees C. The reaction mixture is then cooled and cyclohexane (500 ml.) is added. The mixture is allowed to stand for two hours, and then the liquid from the mixture is decanted into a Claisen flask. Cyclohexane is then distilled and the distillation is continued under reduced pressure to yield a fraction (106 grams). That fraction is redistilled under reduced pressure to yield a water white phenylcyclohexyltrichlorosilane, B. P. 151–152 degrees C. at 1 mm. Hg.

Haloalkylsilanes in which the halo substituent is bromo may be reacted with aromatic hydrocarbons by procedures that are the same as those given for chloroalkylsilanes.

Having described the invention, we claim:

1. A method of producing organosilanes that comprises conducting, in the presence of an aluminum halide in which each halogen atom has an atomic weight between 35 and 80, a condensation reaction in which a hydrogen halide is formed by splitting out a halogen atom having an atomic weight between 35 and 80 from a halo-substituted saturated aliphatic hydrocarbon radical that is connected directly to a silicon atom in a halo-substituted organosilicon compound, and by splitting out a nuclear hydrogen atom from an aromatic compound, all said condensation reaction being conducted by bringing together said aluminum halide and said reactants, the carbon atoms in the molecules from which said hydrogen and halogen atoms are split out being contained in aromatic nuclei and saturated aliphatic radicals, and those which are connected to silicon being aliphatic carbon atoms, and any atom in said molecules other than carbon, hydrogen, halogen and silicon consisting of an oxygen atom connected to silicon, any atom that is connected to such an oxygen atom, other than silicon atoms, and carbon atoms contained in aromatic nuclei and saturated aliphatic radicals, consisting of a hydrogen atom.

2. A method as claimed in claim 1 wherein the substance from which the hydrogen atom is split out and the substance from which the halogen atom is split out are two different substances.

3. A method of producing organosilanes that comprises conducting, in the presence of an aluminum halide in which each halogen atom has an atomic weight between 35 and 80, a condensation reaction in which a hydrogen halide is formed by splitting out a halogen atom from a halo-substituted hydrocarbon radical in a substance whose molecule consists of a silicon atom to which are attached four monovalent radicals not more than two of which are unsubstituted saturated aliphatic hydrocarbon radicals, from one to three of which are halo radicals, and from one to two of which are saturated halo-substituted aliphatic hydrocarbon radicals in which the substituents consist of halogens having an atomic weight between 35 and 80, and by splitting out a nuclear hydrogen atom from an aromatic compound in which any atom other than carbon and hydrogen consists of halogen, said condensation reaction being conducted by bringing together said aluminum halide and said reactants.

4. A method as claimed in claim 3 wherein the aromatic compound is one whose molecule has hydrogen atoms attached to at least two adjacent nuclear carbon atoms.

5. A method as claimed in claim 4 wherein not more than one of the radicals attached to the silicon atom is an unsubstituted hydrocarbon radical and only one of the radicals attached to the silicon atom is a halo-substituted hydrocarbon radical.

6. A method of producing organosilanes that comprises conducting, in the presence of an aluminum halide in which each halogen atom has an atomic weight between 35 and 80, a condensation reaction in which a hydrogen halide is formed by splitting out a halogen atom from a halo-substituted hydrocarbon radical in a substance having the general formula $$w\text{SiCl}_3$$

wherein $w$ is a saturated mono-halo-substituted monovalent aliphatic hydrocarbon radical in which the substituent is a halogen having an atomic weight between 35 and 80, and by splitting out a nuclear hydrogen atom from an aromatic compound in whose molecule there are hydrogen atoms attached to at least two adjacent nuclear carbon atoms and in whose molecule any atom other than carbon and hydrogen consists of halogen said condensation reaction being conducted by bringing together said aluminum halide and said reactants.

7. A method as claimed in claim 6 wherein the aromatic compound has not more than one carbon atom in any one monovalent radical attached to an aromatic nucleus.

8. A method as claimed in claim 7 wherein the substituent in the mono-halo-substituted hydrocarbon radical is chloro.

9. A method as claimed in claim 8 wherein the aluminum halide is aluminum chloride.

10. An organosilicon compound whose molecule contains an aromatic nucleus having a connection to a silicon atom through more than two aliphatic carbon atoms in series, each carbon atom that is connected to a silicon atom being aliphatic, the aliphatic portion of the molecule being saturated, and any atom other than carbon, hydrogen, halogen and silicon consisting of an oxygen atom connected to a silicon atom, any atom that is connected to such an oxygen atom, other than silicon atoms, and carbon atoms contained in aromatic nuclei and saturated aliphatic radicals, consisting of a hydrogen atom.

11. An organosilicon compound as claimed in claim 10 whose molecule contains only one silicon atom.

12. An organosilicon compound having the general formula.

$$v\text{SiCl}_3$$

wherein $v$ is a monovalent aryl-substituted saturated aliphatic hydrocarbon radical in which there is an aromatic nucleus having a connection to the silicon atom through more than two aliphatic carbon atoms in series and in which any other substituent consists of halogen.

13. An organosilicon compound as claimed in claim 12 which has not more than one carbon atom in any one monovalent radical attached to an aromatic nucleus.

14. A gamma-tolylpropyltrichlorosilane.
15. A gamma-tolylbutyltrichlorosilane.
16. A tolylcyclohexyltrichlorosilane.
17. Gamma-phenylpropyltrichlorosilane.
18. A phenylcyclohexyltrichlorosilane.

DAVID B. HATCHER.
RAYMOND H. BUNNELL.

REFERENCES CITED

The following references are of record in the file of this patent:

UNITED STATES PATENTS

| Number | Name | Date |
|---|---|---|
| 2,407,181 | Scott | Sept. 3, 1946 |
| 2,443,898 | Ellingboe | June 22, 1948 |

OTHER REFERENCES

Whitmore: Jour. Am. Chem. Soc., vol. 69 pp. 1976–77.

Whitmore: Jour. Am. Chem. Soc., vol 69, pp. 2108–10.